United States Patent
Buchanan et al.

(10) Patent No.: US 11,871,852 B1
(45) Date of Patent: Jan. 16, 2024

(54) INFLATABLE LUMBAR SUPPORT CUSHION FOR SEATS

(71) Applicants: Charles Buchanan, Queens, NY (US); Christine Riley, Queens, NY (US)

(72) Inventors: Charles Buchanan, Queens, NY (US); Christine Riley, Queens, NY (US)

( * ) Notice: Subject to any disclaimer, the term of this patent is extended or adjusted under 35 U.S.C. 154(b) by 0 days.

(21) Appl. No.: 17/902,424

(22) Filed: Sep. 2, 2022

(51) Int. Cl.
*B60N 2/60* (2006.01)
*A47C 7/46* (2006.01)
*B60N 2/02* (2006.01)
*B60N 2/64* (2006.01)
*B60N 2/66* (2006.01)

(52) U.S. Cl.
CPC ............ *A47C 7/467* (2013.01); *B60N 2/0224* (2013.01); *B60N 2/643* (2013.01); *B60N 2/646* (2013.01); *B60N 2/663* (2015.04); *B60N 2/665* (2015.04)

(58) Field of Classification Search
CPC . B60N 2/60; B60N 2/58; B60N 2/643; B60N 2/646; B60N 2/665; B60N 2/663; A47C 7/467
See application file for complete search history.

(56) References Cited

U.S. PATENT DOCUMENTS

| | | | |
|---|---|---|---|
| 6,929,325 B1 * | 8/2005 | Goelo | A47C 4/54 297/284.6 |
| 9,505,324 B2 | 11/2016 | McMillen et al. | |
| 9,756,956 B1 | 9/2017 | Pekkinen | |
| 10,682,936 B1 * | 6/2020 | Hillenbrand | B60N 2/663 |
| 2016/0088949 A1 * | 3/2016 | Yakubyak | B60R 11/0247 297/229 |
| 2016/0375809 A1 * | 12/2016 | Nguyen | B60N 2/882 297/396 |
| 2019/0047445 A1 * | 2/2019 | Kim | B60N 3/002 |
| 2020/0238874 A1 * | 7/2020 | Mazzucchelli | B60N 2/665 |
| 2020/0375143 A1 * | 12/2020 | Rossi | B32B 5/245 |

* cited by examiner

*Primary Examiner* — Syed A Islam
(74) *Attorney, Agent, or Firm* — Sanchelima & Associates, P.A.; Christian Sanchelima; Jesus Sanchelima (57) ABSTRACT

An inflatable lumbar support cushion for seats including a seat cushion assembly connected with an air bladder that has a hollow body and is covered by a lumbar support that is hollow. The air bladder is inflated by a pump unit assembly which includes a pump unit that blows air to the air bladder by an air hose adapting the size of the lumbar support as required and defining a lumbar support portion which provides comfort to a user. The air bladder configured as a cushion for a sofa. The pump unit can be electronic or manual. The seat cushion can be adapted to different seats by an attaching base located to a bottom surface thereof and the lumbar support may be attached to a backrest by a strap allowing to fasten the inflatable lumbar support cushion to any suitable seat.

8 Claims, 6 Drawing Sheets

INFLATABLE LUMBAR SUPPORT CUSHION FOR SEATS

BACKGROUND OF THE INVENTION

1. Field of the Invention

The present invention relates to an inflatable lumbar support cushion for seats and, more particularly, to an inflatable lumbar support cushion for seats that can be inflated by an air bladder with the manual or electric pump unit placed along a side of a seat cushion allowing to define a lumbar support portion configured to provide comfort to a user.

2. Description of the Related Art

Several designs for an inflatable lumbar support cushion for seats have been designed in the past. None of them, however, include a seat with an inflatable lumbar support which can be operated by an inflatable bladder with a manual or electric pump unit having a seat cushion.

Applicant believes that a related reference corresponds to U.S. Pat. No. 9,505,324 issued for a lumbar support apparatus that includes an air bladder and a pump mechanism. Applicant believes that another related reference corresponds to U.S. Pat. No. 9,756,956 issued for a mattress with an inflatable lumbar support member that is inflated by use of an electrical pump. None of these references, however, teach of a seat cushion with a back member that contains an inflatable bladder that can be filled by use of a manual or electric air pump unit.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a comfortable seat cushion with an inflatable lumbar support.

It is another object of this invention to provide a pump unit that blows air to a lumbar support as required to reduce physical stress and pain when seating thereof.

It is still another object of the present invention to provide a detachable seat cushion and a detachable lumbar support to provide comfort to driver seats with an adjustable and portable design.

It is still another object of the present invention to provide an inflatable lumbar support cushion for chairs ideal for bus drivers, truckers, rideshare drivers, households, individuals who use wheelchairs, sofas, or any other suitable seat as known in the art.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a representation of a side view of the seat cushion 22 and the air bladder 62. The pump unit 62 has an attaching portion 62a.

DETAILED DESCRIPTION OF THE EMBODIMENTS OF THE INVENTION

Referring now to the drawings, where the present invention is generally referred to with numeral 10, it can be observed that it basically includes a seat cushion assembly 20, an air bladder assembly 40 and a pump unit assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
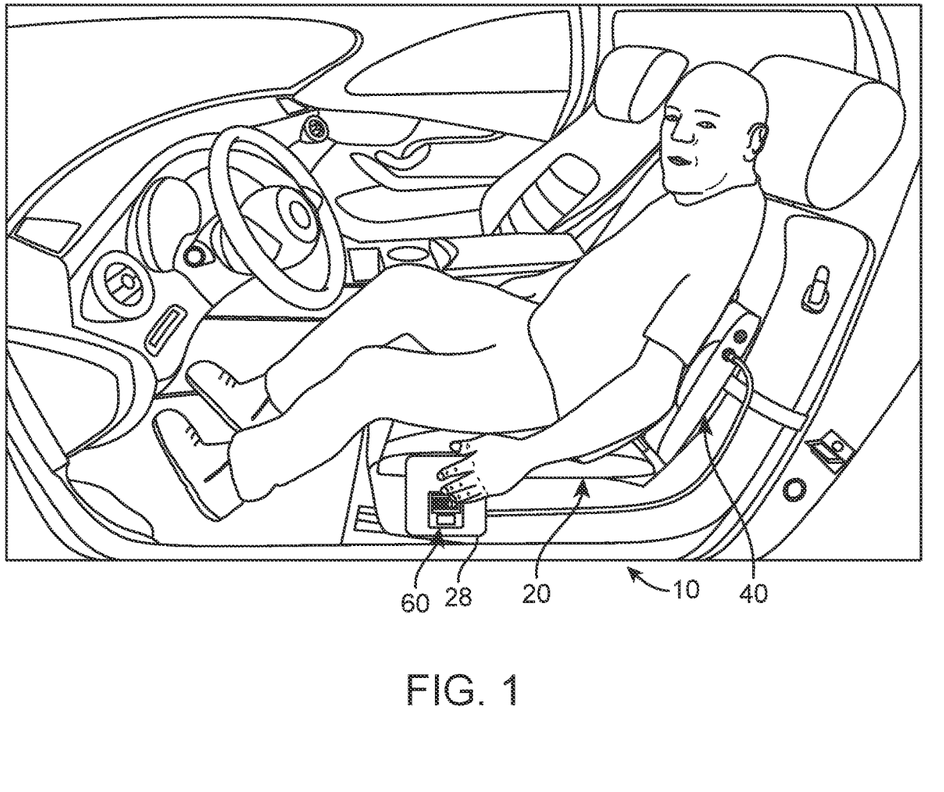
FIG. 1 represents an operational view of the present invention 10 wherein is shown a seat cushion assembly 20, an air bladder assembly 40 and a pump unit assembly 60
Figure 3:
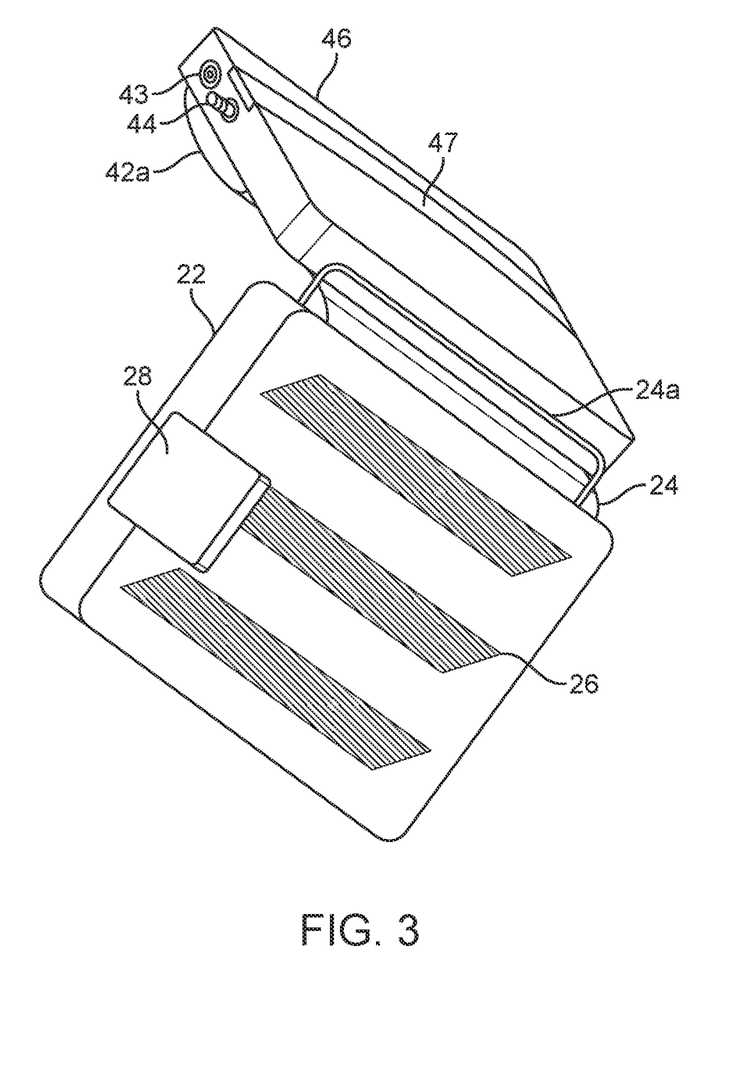
FIG. 3 illustrates a rear perspective view of the seat cushion 22 and the air bladder 62 interlocked by foldable portion 24. A strap 47 is attached to the back of the air bladder 42 on a lumbar support 46. A carrying handle 24a is attached to a rear side of the seat cushion 22.

The seat cushion assembly 20 includes a seat cushion 22, a foldable portion 24, a handle carrying 24a, an attaching base 26 and an adjustable front to back 28. The cushion 22 may be configured to be attached to a drivers' chair considering a truck driver, bus driver, personal driver or any other variation thereof. In another embodiment the cushion 22 may also be configured to be attached to a wheelchair seat or any other seat. The seat cushion 22 may have a square shape that conforms with the body of any type of seat. Nevertheless, in other embodiments, the seat cushion 22 may have a rectangular shape, circular shape, triangular shape, octagonal shape, hexagonal shape or any other variation thereof. In a suitable embodiment, the seat cushion 22 may provide comfort to a user when sitting on the seat cushion 22. In another embodiment, the seat cushion 22 may be configured as a pillow. It is to be considered that seat cushion 22 may be made of a memory foam material. However, in other embodiments the seat cushion 22 may be made of a gel, sponge, soft pliable material, or any soft and suitable material as known in the art for the purposes herein described. It may be considered that the seat cushion may have the handle carrying 24a which extends along each distal end of the rear side of the seat cushion 22 as best observed in FIG. 3 and FIG. 4. The adjustable front to back 28 may be configured to hold the pump unit assembly 60 which may have a hook and loop fastener configuration. The adjustable front to back 28 may be suitable to be attached to at least one lateral side of the seat cushion 22 as best observed in FIG. 1 and FIG. 3. It may be considered that either manual pump units or electric pump units are suitable to be attached to the adjustable front to back 28.

Figure 2:
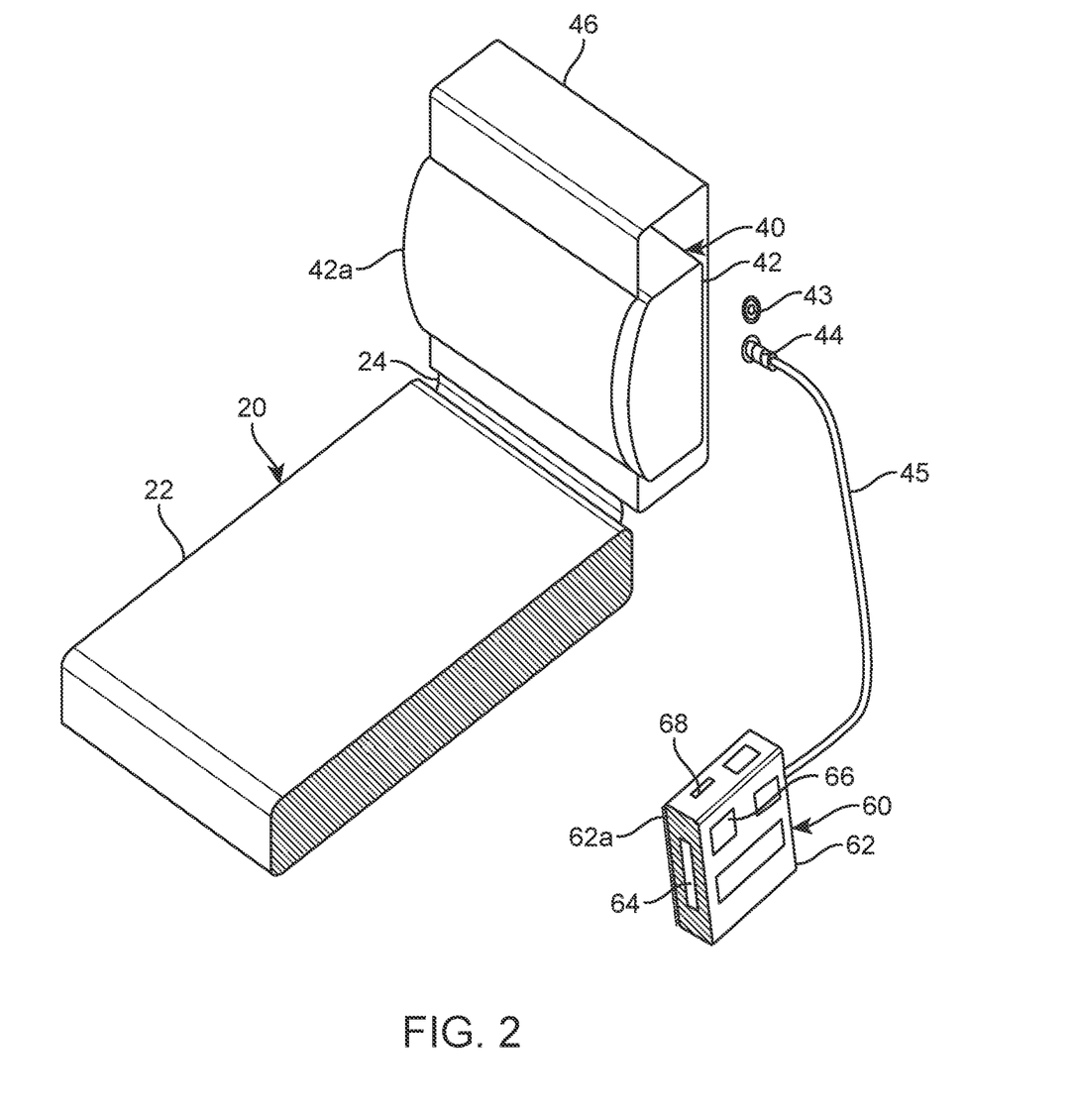
FIG. 2 shows a sectional view of the seat cushion assembly 20 and a lumbar support 46 wherein is shown an air bladder 42 which defines a lumbar support portion 42a. A pump unit 62 is shown as a sectional view wherein battery 64 is located therein.

The seat cushion 22 may include a foldable portion 24 placed in the rear side thereof over the handle carrying 24a as best observed in FIG. 2. The foldable portion 24 may be suitable to have a rectangular body, which conforms with the rear side of the seat cushion 22 allowing to interlock the air bladder assembly 40. The foldable portion 24 may be suitable to be made of a polystyrene material. In a preferred embodiment, the foldable portion 24 may be suitable to be attached to the rear side of the seat cushion 22. Nevertheless, in other embodiments, the foldable portion 24 may be attached to a top rear portion of the seat cushion 22 or a bottom rear portion of the seat cushion 22. When attaching the seat cushion 22 in a seat, the attaching base 26 may be evenly flush and abutting with a top surface of the seat. The attaching base 26 may be suitable to have a shape that conforms with the body of the seat cushion 22 and may be configured to allow the seat cushion 22 be stable when sitting thereon. In a preferred embodiment, the attaching base 26 may be suitable to be made of a Velcro material. Nevertheless, the attaching base 26 may be made of an anti-slip material like a rubber pad, anti-skid tape, non-skid foam or any other variation thereof that allow the seat cushion 22 to be affixed and steady upon a seat. In a preferred embodiment, the foldable portion 24 may allow to hold the present invention 10 by the handle carrying 24a which is adapted to a rear side of the seat cushion 22.

The air bladder assembly 40 includes an air bladder 42, a lumbar support portion 42a that cooperates with a lumbar support 46, a pressure valve 43, a hose connector 44, an air hose 45, and a strap 47. In an exemplary embodiment, the air bladder 42 may be operatively connected with the seat cushion 22 by the foldable portion 24 as shown in FIG. 2. The air bladder 42 is connected by the bottom portion thereof. The air bladder 42 may be made of a rubber material and covered by a sponge with memory foam providing great comfort to a user. The air bladder 42 is configured to be inflated defining the lumbar support portion 42a which provides comfort and support to the lumbar portion of a user. In a preferred embodiment, the air bladder 42 may have the pressure valve 43, the hose connector 44 operatively connected to the lateral side thereof as best observed in FIG. 4 to cooperate with the air pump unit assembly 62 which permit to define the lumbar support portion 42a. The pressure valve 43 in a suitable embodiment, may be made of a brass, plastic and aluminum material. Nevertheless, in another embodiment, the pressure valve 43 may be made of a steel alloy. The pressure valve 43 may limit the amount of compressed air pressure within the air bladder 42 to forestall structural damages. The pressure valve 43 may be any suitable valve as known in the art to relief internal pressures within a storing/receiving element. In a preferred embodiment, the lumbar support portion 42a may be defined by the air bladder 42 which is made of a rubber material and cooperate with the material used for the seat cushion 22 to provide a comfortable chair to the user.

Figure 5:
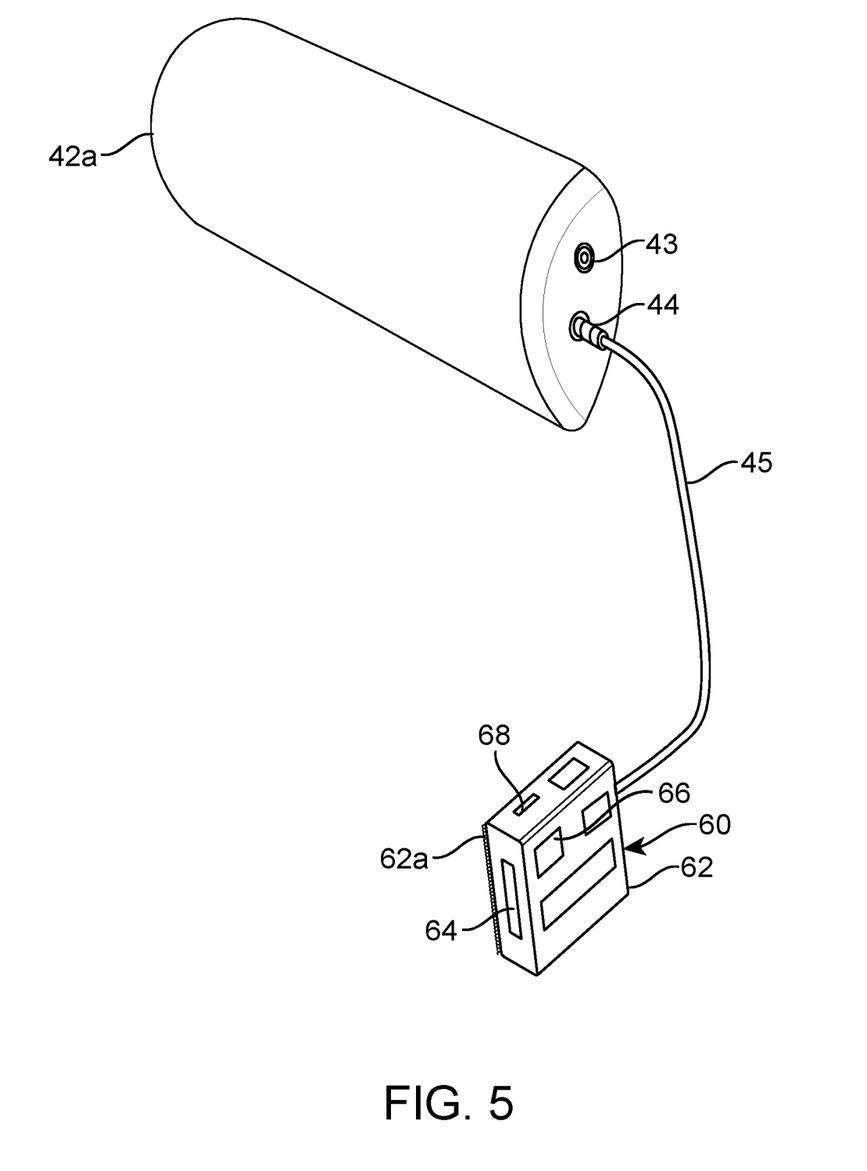
FIG. 5 is an isometrical view of the air bladder 42 a pressure valve 43 and a hose connector 44 are placed on a side of the air bladder 42.
Figure 6:
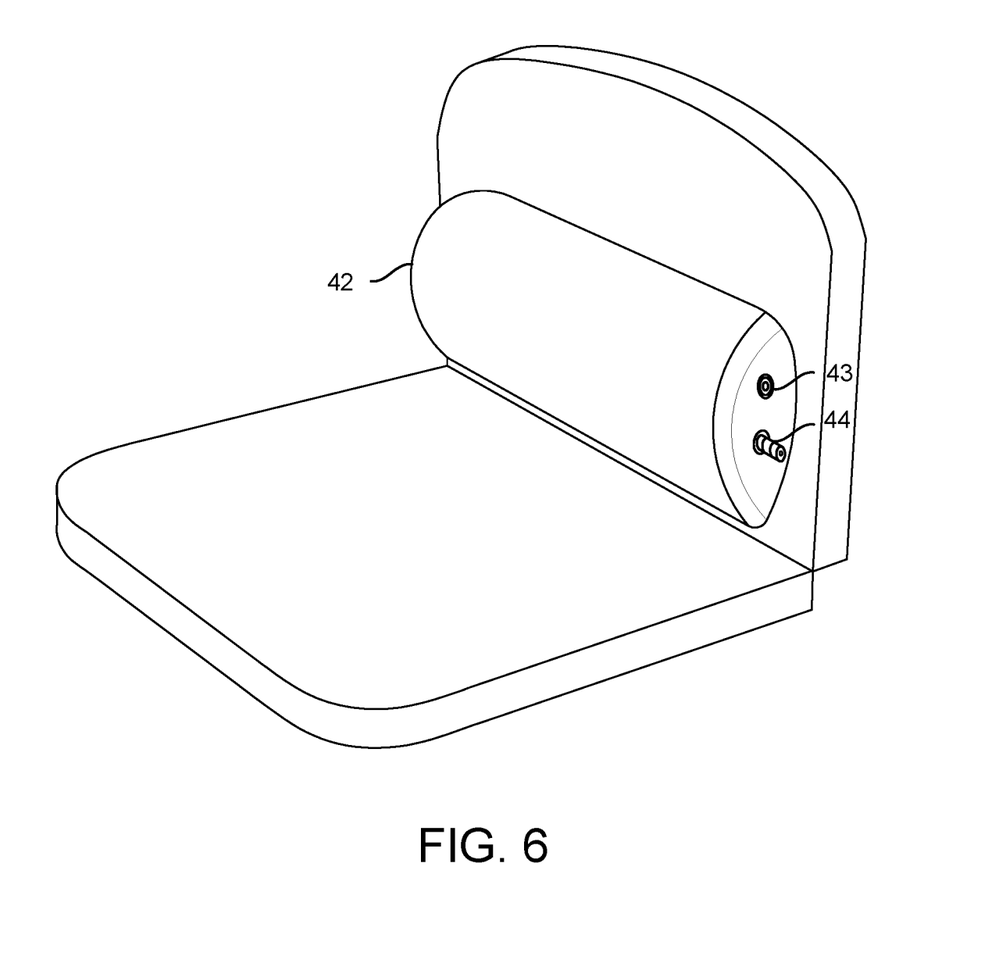
FIG. 6 shows an isometrical view of the air bladder 42 attacked to a sofa/chair as one single item.

The various embodiments herein described for the present invention are for explanatory purposes and it should be understood that the present invention may be used in different scenarios and may cooperate with different elements as known in the art to support a person in a sitting position. In an exemplary embodiment, as best observed in FIG. 2, the air bladder 42 may be configured to be inserted within the lumbar support 46 which cooperates to support a lumbar portion of the user when inflating the air bladder 42 by means of the hose connector 44 defining the lumbar support portion 42a. In another exemplary embodiment, as the one illustrated in FIGS. 5-6, the present invention 10 may operatively cooperate with a sofa, wherein the sofa is encompassed by the definition mentioned above as to the different elements to which the present invention may be attached. In the present exemplary embodiment illustrated in FIGS. 5-6, the air bladder 42 may be used as an external lumbar support configured to be attached to the sofa (or any other suitable seat as known in the art, the sofa is herein mentioned for illustrative purposes). In a preferred embodiment, the air bladder 42 may be configured as a lumbar support, a cushion, or a pillow wherein in each of the embodiments the air bladder 42 may provide comfort to the user when attached to a sofa or any other suitable seat. In another exemplary embodiment, the air bladder 42 when used as an external cushion may be customized by covers which may conform with the body of the air bladder 42 and may exhibit different ornamental patterns on its external surface. In one embodiment, the pressure valve 43 and the hose connector 44 may be attached to a lateral side of the air bladder 42 when using the air bladder 42 as a cushion allowing to inflate the air bladder 42 by the pump unit assembly 60.

Figure 4:
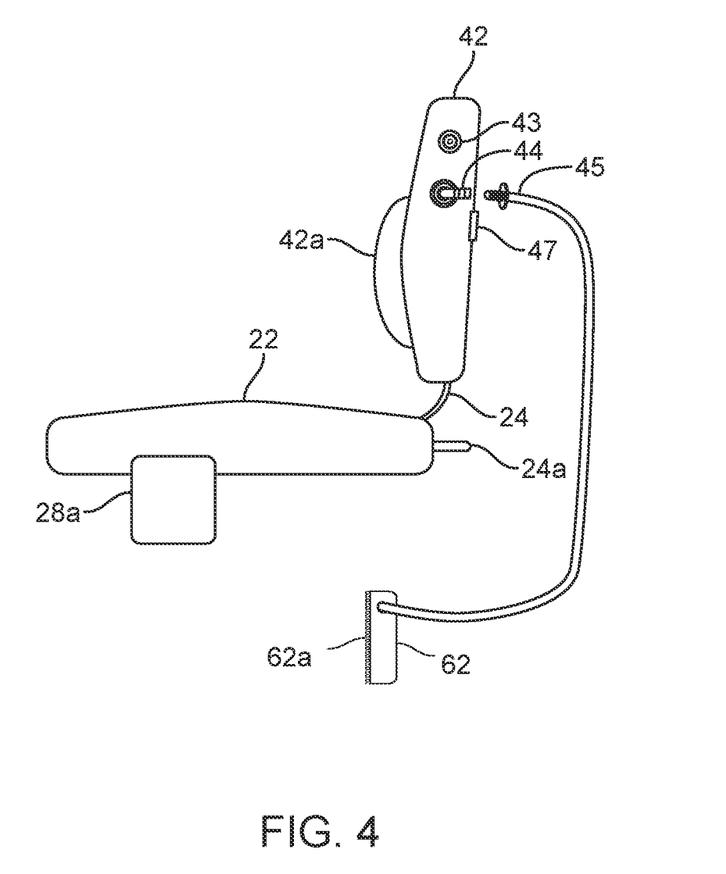

As best observed in FIG. 4 the hose connector 44 may be attached proximal to the pressure valve 43 in a bottom portion thereof. In a suitable embodiment, the hose connector 44 may be made of a rubber material to allow it to interlock the air hose 45 by pressure. The hose connector 44 may be configured to receive the air hose 45 as best observed in FIG. 2, the hose connector 44 may also be configured as an aperture to the air bladder 42 when connecting the air hose 45 to inflate the air bladder 42 by the pump unit assembly 60. The air hose 45 may be related to the air pump unit assembly 60 and the hose connector 45 at once and be removed from the air bladder 42. In a preferred embodiment, the air hose 45 may have an elongated cylindrical hollow body. The air hose 45 may be made of a polyvinyl chloride material. Nevertheless, in other embodiments, the air hose 45 may be made of a polyurethane, rubber, neoprene, nylon or any other variation thereof suitable for a duct air.

The air bladder 42 may have the lumbar support 46 which covers the entire body of the air bladder 42. In a preferred embodiment, the lumbar support 46 may only cover the air bladder 42 leaving in the exterior the pressure valve 43 and the hose connector 44 as best observed in FIG. 4 which may have a cylindrical body. The lumbar support 46 may be suitable to have a body that conforms with the air bladder 42, it is to be considered that the body of the lumbar support 46 may be hollow. In a preferred embodiment the air bladder 42 may be made of a memory foam material. Nevertheless, in other embodiments the seat cushion 22 may be made of a gel, sponge, soft pliable material or any other variation thereof. In a preferred embodiment, the lumbar support 46 may be configured to provide comfort to a lumbar portion of a user when seating in the seat cushion and the lumbar support 46. The strap 47 in a preferred embodiment, may be attached to a rear surface of the lumbar support 46 as best observed in FIG. 3 the strap is attached to a half portion thereof. The strap 47 may be suitable to be made of a resistant latex to allow the lumbar support 46 be attached to a backrest of a seat. In another embodiment the strap 47 may allow to fasten the air bladder 42 and the seat cushion 42.

The pump unit assembly 60 includes a pump unit 62, an attaching portion 62a, a battery 64, buttons 66 and an input 68. In a preferred embodiment, the pump unit 62 may be configured to provide air by inflating the air bladder 42 through the air hose and the hose connector 44 which may be the aperture for the air bladder 42. The pump unit 62 may have a rectangular hollow body that allows the pump unit 62 to store a battery 64 in the inner thereof. In a preferred embodiment, the pump unit 62 may be made of a steel material. Nevertheless, other materials like metal, iron, plastic, steel alloys or any other variation thereof. It is to be considered that the pump unit 62 may be related to the air hose 45 to allow blow air through the air hose 45 and inflate the air bladder 42. The pump unit 62 may include buttons configured to activate the pump unit 62. It is to be considered that in one embodiment, the pump unit 62 may be attached to a lateral side of the driver seats as best observed in FIG. 1 and considering that the pump unit 62 may be attached by the attaching portion 62a which may be made of a Velcro material which allows the pump unit 62 to be attached to the lateral side of the driver seats. In a preferred embodiment, the attaching portion 62a may have a shape that conforms with the shape of the rear side of the pump unit 62 as shown in FIG. 4. The battery 64 may be configured to power the pump unit 62 and may be rechargeable by an input 68 which is attached to a top surface of the pump unit 62. The battery 64 may have a rectangular body and may be attached in the inner of the pump unit 62. In one embodiment, the buttons 66 may have a rectangular shape. Nevertheless, the buttons 66 may have a circular shape, triangular shape, or any other variation thereof. The buttons 66 may be configured to turn on and turn off the pump unit 62 which allows to insert air through the air hose 45 to the air bladder 42 when pump unit 62 is turned on by one of the buttons 66. It is to be considered that the input 68 may allow the battery 64 to be rechargeable by any external charger device and may have any shape like a rectangular shape as illustrated in FIG. 2.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An inflatable lumbar support cushion for seats, comprising:
    a lumbar support attached by a foldable portion to a seat cushion a seat cushion which is made of a memory foam material, the seat cushion is configured to be evenly flush and abutting with a top surface of a support for users sitting position hereinafter defined as a seat, wherein said seat cushion has an attaching base in the bottom surface thereof to affix said seat cushion upon the seat, said seat cushion includes a carrying handle placed along a rear side portion thereof, wherein said carrying handle is a tubular member defining a rectangular frame with rounded corners extending from a rear portion of the cushion, said lumbar support includes an air bladder which is related to an air housing of a pump unit assembly including a pump unit, said pump unit allows to blow air through and air hose to inflate said lumbar support, said pump unit is configured to keep a desire volume of the lumbar support, thereby defining a lumbar support portion, said lumbar support having a strap to fasten said lumbar support to a backrest seat, wherein said strap is a rectangular band extending from lateral sides of the lumbar support defining a closed loop with a rear portion of said lumbar support, said air bladder configured to be used on a sofa, said air bladder is made of sponge and has a memory foam covering, wherein said air bladder is entirely covered by said lumbar support to define a lumbar support portion when inflated by means of said air pump unit, wherein said air bladder is entirely covered by said lumbar support to define a lumbar support portion when inflated by means of said air pump unit.

2. The inflatable lumbar support cushion for seats of claim 1, wherein said air bladder can be adjusted to the inner of said lumbar support or can be adjusted as a cushion for the seat, wherein said seat is a sofa.

3. The inflatable lumbar support cushion for seats of claim 1, wherein said lumbar support includes a pressure valve to limit the amount of compressed air pressure within the air bladder to forestall structural damages.

4. The inflatable lumbar support cushion for seats of claim 1, wherein said lumbar support includes a hose connector to attach said air hose and inflate said air bladder to define said lumbar support portion along a front surface of said lumbar support.

5. The inflatable lumbar support cushion for seats of claim 1, wherein said foldable portion allows said seat cushion and lumbar support to be in a pillow configuration.

6. The inflatable lumbar support cushion for seats of claim 1, wherein said air pump unit blows air through said air hose as required by buttons placed on said pump unit to be manually actuated.

7. The inflatable lumbar support cushion for seats of claim 1, wherein said pump unit may be a manual or electrical pump unit to inflate said air bladder and can be adapted to an adjustable front to back by a hook and loop configuration.

8. An inflatable lumbar support cushion for seats, consisting of:
    a seat cushion made of memory foam material, said seat cushion includes a foldable portion placed in a rear side thereof, said seat cushion having an attaching base to permit the seat cushion to be evenly flush and abutting with a top surface of a support for users sitting position hereinafter defined as a seat, said attaching base made of a hook and loop material, said seat cushion further holds an air pump unit by an adjustable front to back, said adjustable front to back is attached to a lateral side of said cushion support, said seat cushion includes a carrying handle placed along a rear side portion thereof, wherein said carrying handle is a tubular member defining a rectangular frame with rounded corners extending from a rear portion of the cushion;
    an air bladder with a square hollow body, said air bladder including a hose connector and a pressure valve, said air bladder being covered by a lumbar support which define a lumbar support portion when inflating thereof, said air bladder configured to inflate said lumbar support, said hose connector and pressure valve remain exposed outside said lumbar support, said air bladder further related to a pump unit by an air hose, pressure valve configured to limit the amount of compressed air pressure within the air bladder to forestall structural damages, said lumbar support including a strap on the rear side to attach said lumbar support to a backrest, wherein said strap is a rectangular band extending from lateral sides of the lumbar support defining a closed loop with a rear portion of said lumbar support, said air bladder can be adjusted to the inner of said lumbar support or can be adjusted as a cushion for a sofa, wherein said air bladder is made of a rubber material and covered by a sponge with memory foam; and
    the pump unit having a hollow body to store a battery, said pump unit has buttons to activate said pump unit to blow air to said air bladder when connecting said air hose to said hose connector, said pump unit configured as a detachable pump unit to attach to a lateral side or any side of driver seats, said pump unit being charged by the battery which is rechargeable by an input attached to a top surface thereof, said air pump unit defines a lumbar support portion along a front surface of said lumbar support, said air pump unit is configured to be adapted to said adjustable front to back by a hook and loop configuration.

* * * * *